US009642486B1

(12) United States Patent
Obiora et al.

(10) Patent No.: US 9,642,486 B1
(45) Date of Patent: May 9, 2017

(54) LEAF JUICE EXTRACTING APPARATUS (71) Applicants: Ifeoma Obiamaka Obiora, Peoria, AZ (US); Nkemdirim Chinwendu Obiora, Peoria, AZ (US)

(72) Inventors: Ifeoma Obiamaka Obiora, Peoria, AZ (US); Nkemdirim Chinwendu Obiora, Peoria, AZ (US)

(*) Notice: Subject to any disclaimer, the term of this patent is extended or adjusted under 35 U.S.C. 154(b) by 0 days.

(21) Appl. No.: 15/202,040

(22) Filed: Jul. 5, 2016

(51) Int. Cl.
*A47J 31/40* (2006.01)
*A47J 19/06* (2006.01)
*A23N 3/00* (2006.01)
*A47J 43/044* (2006.01)

(52) U.S. Cl.
CPC ............. *A47J 19/06* (2013.01); *A23N 3/00* (2013.01); *A47J 43/044* (2013.01)

(58) Field of Classification Search
CPC .................................................. A47J 19/027
USPC ......... 99/509–513, 536, 495, 492, 493, 484, 99/489, 416, 446, 295, 281, 280, 288, 99/279
See application file for complete search history.

(56) References Cited

U.S. PATENT DOCUMENTS

| | | | |
|---|---|---|---|
| 3,998,143 A * | 12/1976 | Frye | A47J 31/505 219/436 |
| 4,700,621 A | 10/1987 | Elger | |
| 5,222,430 A | 6/1993 | Wang | |
| 5,479,851 A * | 1/1996 | McClean | A47J 19/027 210/360.1 |
| 5,495,795 A | 3/1996 | Harrison et al. | |
| 5,896,812 A | 4/1999 | Basora et al. | |
| 6,050,180 A | 4/2000 | Moline | |
| 6,793,075 B1 * | 9/2004 | Jeter | A47G 19/2272 206/459.1 |
| 8,939,070 B2 | 1/2015 | Cheung et al. | |
| 9,016,196 B2 | 4/2015 | Hensel | |
| 2007/0214966 A1 * | 9/2007 | Bishop | A47J 31/52 99/280 |
| 2008/0307975 A1 * | 12/2008 | Kodden | A47J 31/4457 99/280 |
| 2008/0314261 A1 | 12/2008 | Hensel | |
| 2009/0272280 A1 | 11/2009 | Cheung et al. | |
| 2010/0304357 A1 * | 12/2010 | Meyers | G01N 33/52 435/4 |

(Continued)

*Primary Examiner* — Phuong Nguyen
(74) *Attorney, Agent, or Firm* — Dale J. Ream (57) ABSTRACT

A leaf juice extracting apparatus includes a processing assembly having that defines a processing chamber for receiving a plurality of leaves and water, a side wall thereof having an upper rim that defines an open top configured to allow access therein. The extracting apparatus includes a steam assembly in fluid communication with the processing chamber for selectively receiving an incoming water portion from the processing chamber into a steam chamber, the steam chamber including a heating element for changing the incoming water portion into steam. An extraction member is selectively situated in the processing chamber of the processing chamber for selectively applying pressure upon the plurality of leaves therein so as to cause juice to be extracted from the plurality of leaves. A collection assembly is in fluid communication with the processing chamber that is configured to selectively communicate the extracted juice from the processing chamber into a collection reservoir.

16 Claims, 11 Drawing Sheets

(56) References Cited

U.S. PATENT DOCUMENTS

2012/0192729 A1   8/2012   Huang
2013/0202751 A1   8/2013   Vidal et al.

* cited by examiner

LEAF JUICE EXTRACTING APPARATUS

BACKGROUND OF THE INVENTION

This invention relates generally to food processing devices and, more particularly, to an apparatus for processing and extracting juice that is naturally found in bitter leaves.

Although perhaps little known in some cultures, the use and benefits of juice from some strains of bitter leaves is known to have many health benefits including, but not limited to, reducing sugar in persons with diabetes, cleansing and support liver and gallbladder health, regulating cholesterol, preventing malaria, and more. In addition to its desirable medicinal value, forms of bitter leaf juice are often enjoyed as a delicacy in some cultures.

Various devices and methods are known for kneading, squeezing, and pressing bitter leaves so as to extract the juice that is held therein. Although presumably effective for their intended purpose, there is no apparatus that brings together all of the components and methods in a novel apparatus so that a consumer can extract and prepare bitter leaf juice in a home environment and without expertise. Further, the existing devices do not enable a user to knead and apply pressure manually to the leaves while elements of steam generation, ozone generation, heating, and juice collection are handled automatically under program control.

Therefore, it would be desirable to have a leaf juice extracting apparatus that presses leaves in a processing chamber so as to extract juice from the leaves. Further, it would be desirable to have a leaf juice extracting apparatus configured to impart heat and steam to the processing of the leaves. In addition, it would be desirable to have a leaf juice extracting apparatus that automatically collects the extracted juice after first being filtered and where the collection reservoir is removable from the apparatus.

SUMMARY OF THE INVENTION

A leaf juice extracting apparatus for extracting juice from a plurality of leaves according to the present invention includes a processing assembly having a bottom wall and an upstanding side wall that, together, define a processing chamber for receiving the plurality of leaves and water, the side wall having an upper rim that defines an open top configured to allow access into the processing chamber. The extracting apparatus includes a steam assembly in fluid communication with the processing chamber for selectively receiving an incoming water portion from the processing chamber or a storage tank into a steam chamber, the steam chamber including a steam heating element configured to change the incoming water portion into steam.

An extraction member is selectively situated in the processing chamber of the processing chamber and configured to selectively apply pressure upon the plurality of leaves therein so as to cause juice to be extracted from the plurality of leaves. A collection assembly is in fluid communication with the processing chamber that is configured to selectively communicate the extracted juice from the processing chamber into a collection reservoir.

Therefore, a general object of this invention is to provide a leaf juice extracting apparatus that presses leaves in a processing chamber so as to extract juice from the leaves.

Another object of this invention is to provide a leaf juice extracting apparatus, as aforesaid, having a steam generating assembly configured to generate heat and steam to the processing of the leaves.

A further object of this invention is to provide a leaf juice extracting apparatus, as aforesaid, having a collection assembly configured to receive and contain juice extracted from the leaves.

A still further object of this invention is to provide a leaf juice extracting apparatus, as aforesaid, that may be powered by AC, battery, or solar energy.

Yet another object of this invention is to provide a leaf juice extracting apparatus, as aforesaid, have filtration, ozone treatment, weighing, and dehydration features.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is an isolated view on an enlarged scale taken from FIG. 1a;

FIG. 2a is a rear perspective view of the juice extraction apparatus as in FIG. 1a;

FIG. 2b is an isolated view on an enlarged scale taken from FIG. 2a;

FIG. 2c is an isolated view on an enlarged scale taken from FIG. 2b;

FIG. 3a is an exploded view of the juice extraction apparatus as in FIG. 1a;

FIG. 3b is an isolated view on an enlarged scale taken from FIG. 3a;

FIG. 4a is another perspective view of the juice extraction apparatus as in FIG. 1a illustrated with the lid removed and with an extraction member being inserted into the processing chamber;

FIG. 4b is an isolated view on an enlarged scale taken from FIG. 4a;

FIG. 6b is a rear perspective view of the juice extraction apparatus as in FIG. 6a;

FIG. 7b is a top view of the processing assembly as in FIG. 7a;

FIG. 8a is a side view of the juice extraction apparatus as in FIG. 1a;

FIG. 8b is a sectional view taken along line 8b-8b of FIG. 8a;

FIG. 8g is a sectional view taken along line 8g-8g of FIG. 8a;

DESCRIPTION OF THE PREFERRED EMBODIMENT

Figure 1A:
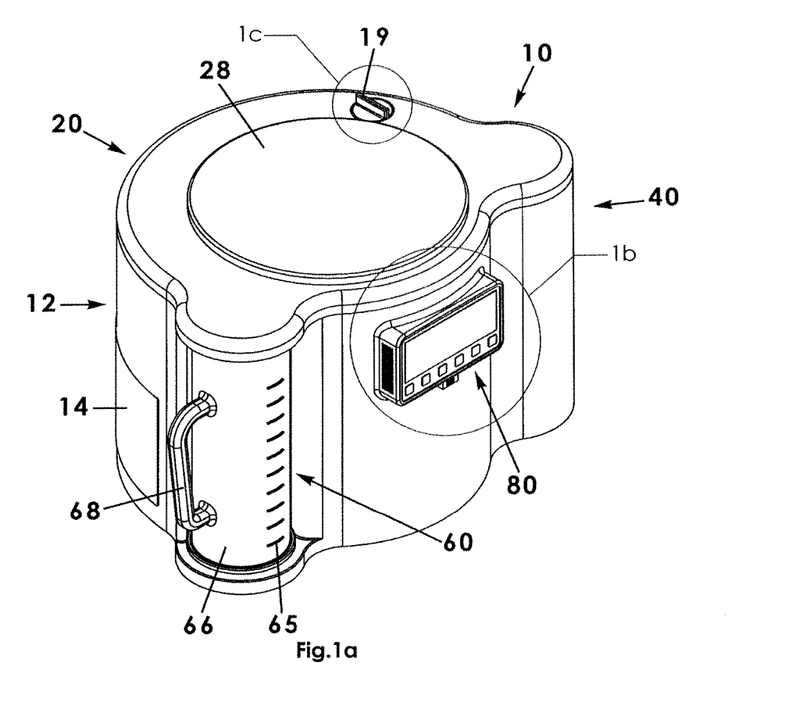
FIG. 1a is a perspective view of a leaf juice extraction apparatus according to a preferred embodiment of the present invention.
Figure 1B:
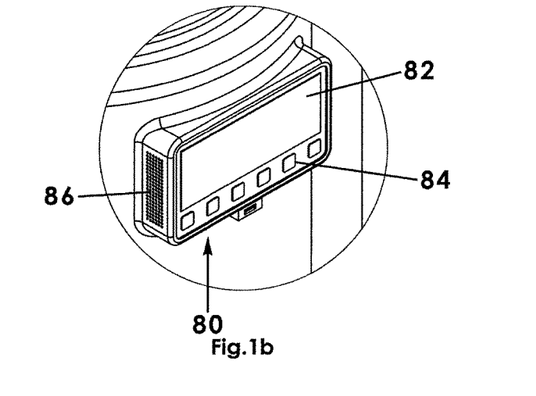
Figure 1C:
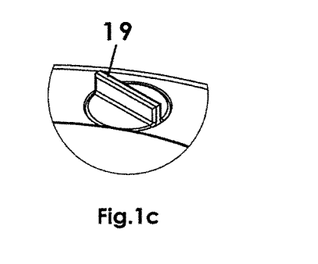
FIG. 1c is an isolated view on an enlarged scale taken from FIG. 1c.
Figure 2A:
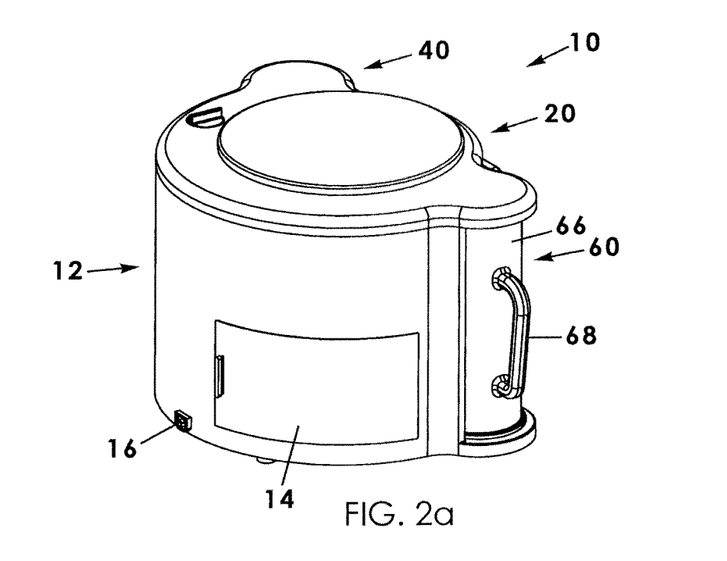
Figures 2B, 2C:
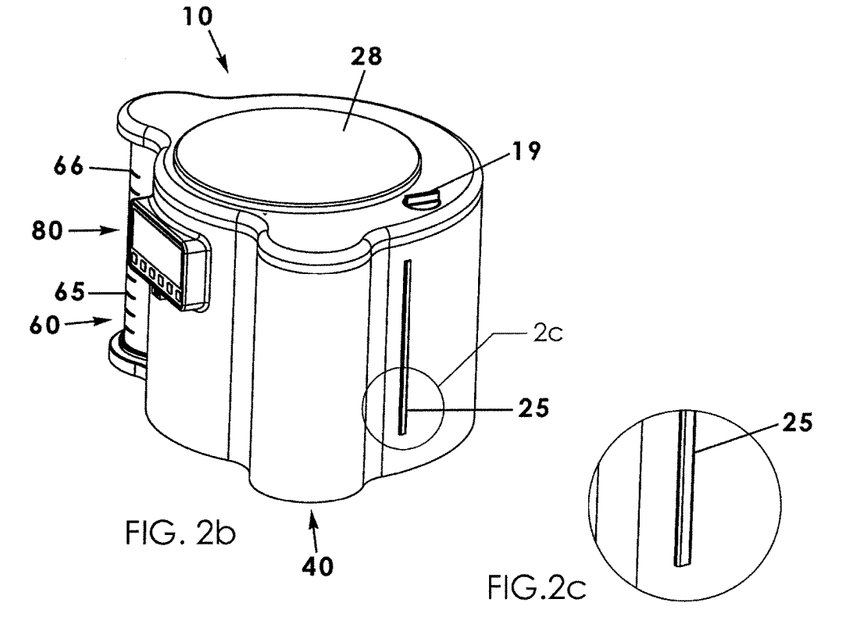
Figure 3A:
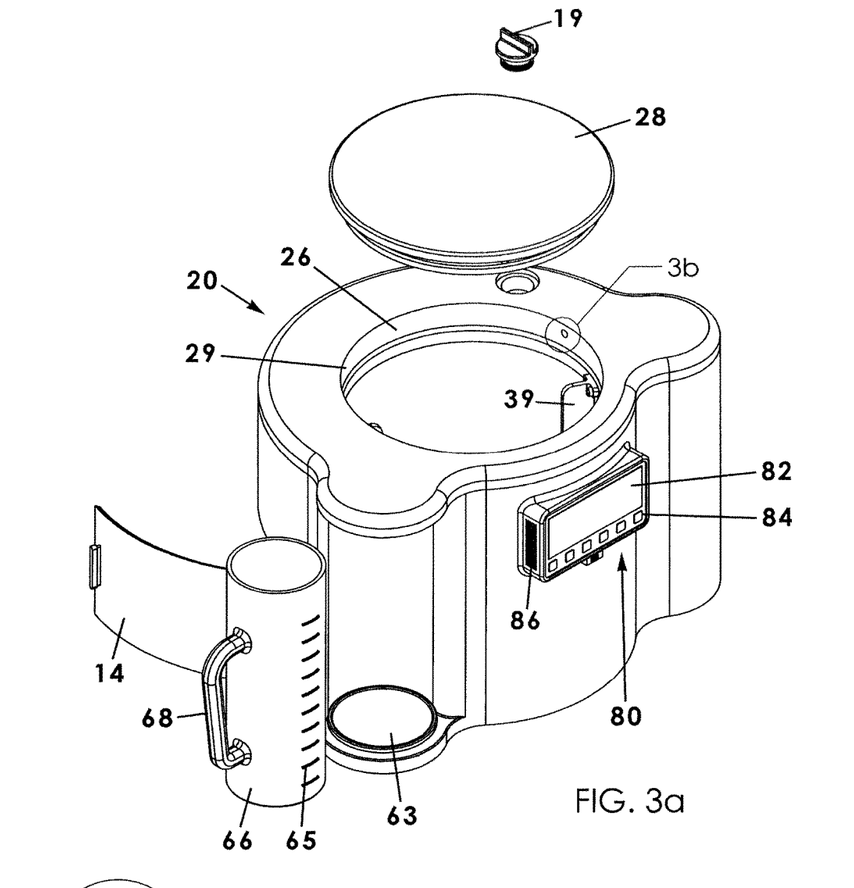
Figure 3B:
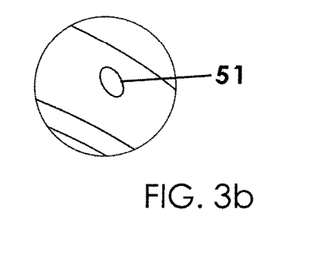
Figures 4A, 4B:
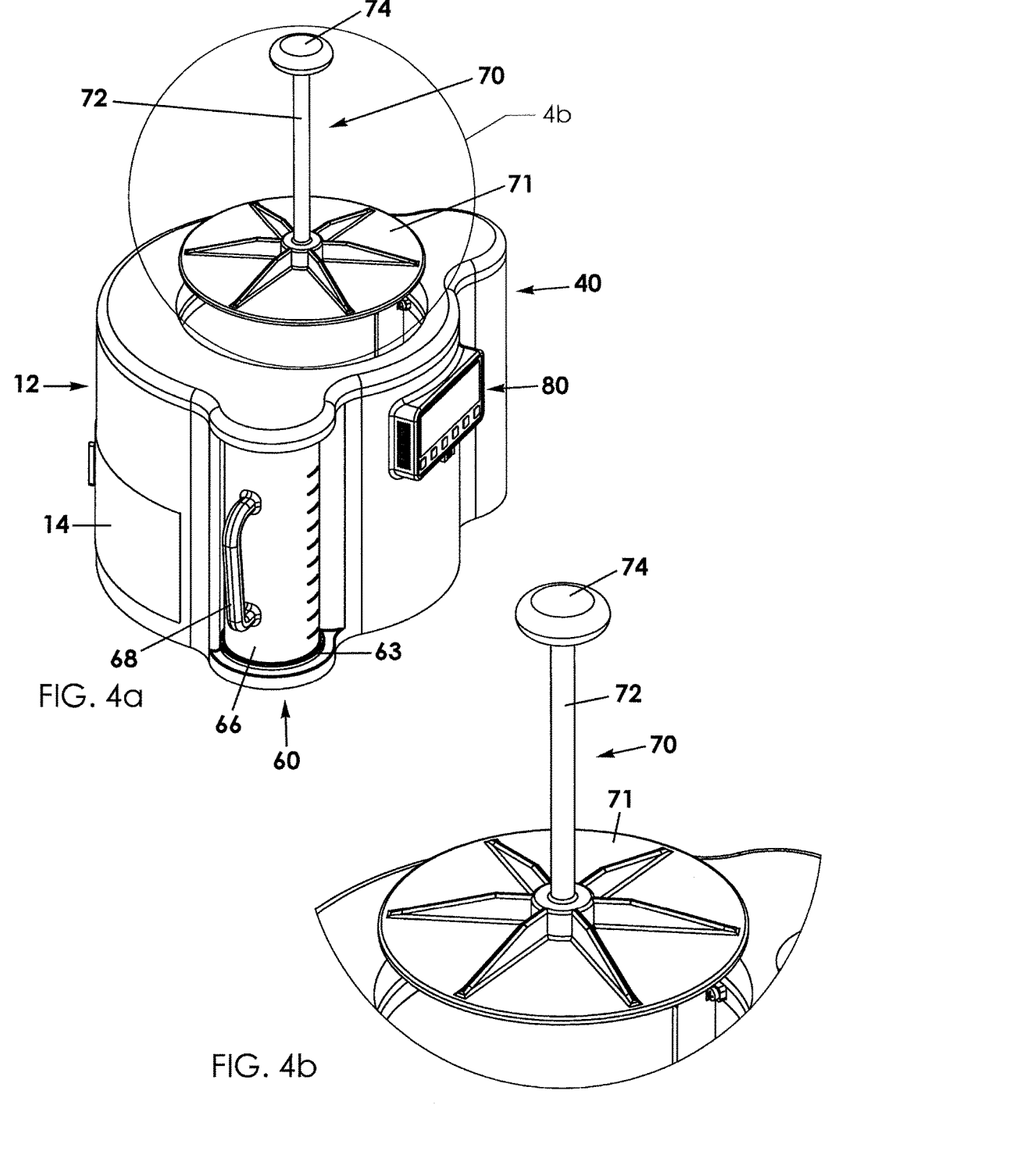
Figure 5A:
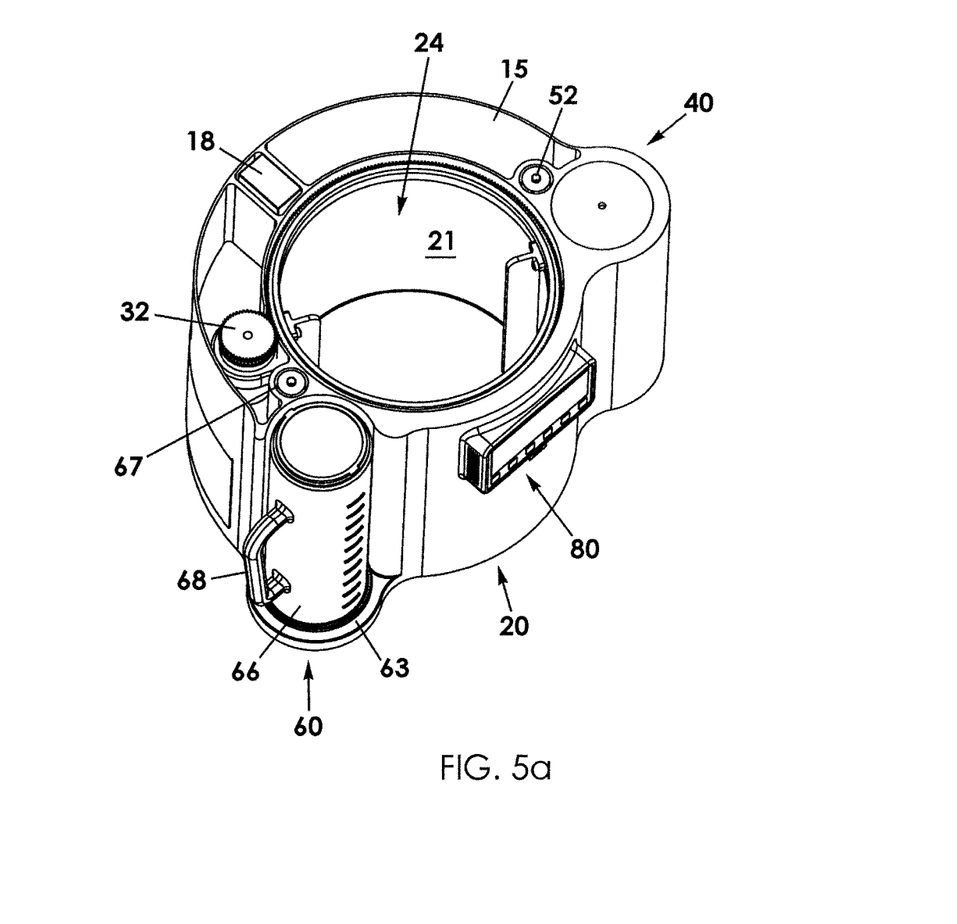
FIG. 5a is another perspective view of the juice extraction apparatus as in FIG. 1a illustrated with a top wall of the housing removed for clarity.
Figure 6A:
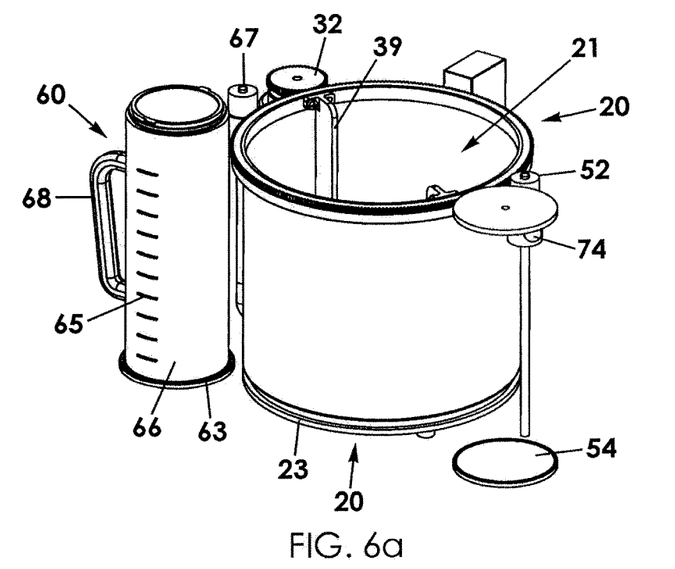
FIG. 6a is a front perspective view of the juice extraction apparatus as in FIG. 1a with the outer housing removed for clarity of the internal systems.
Figure 6B:
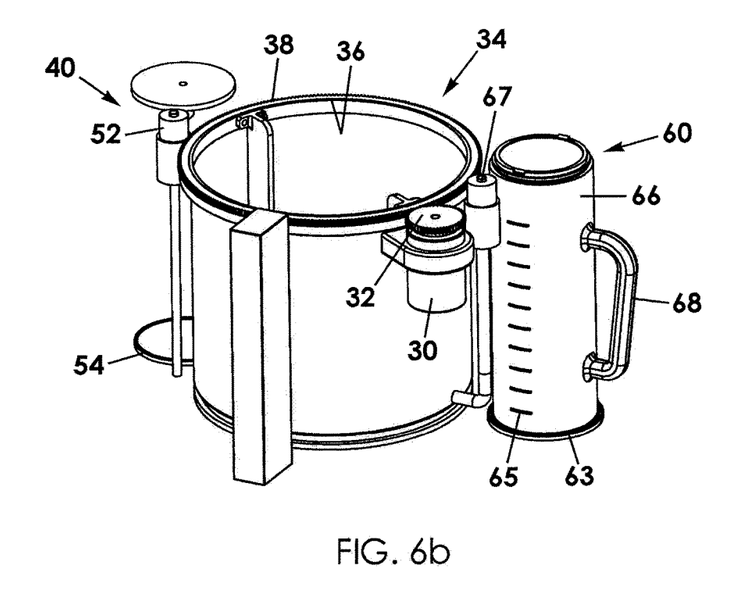
Figure 7A:
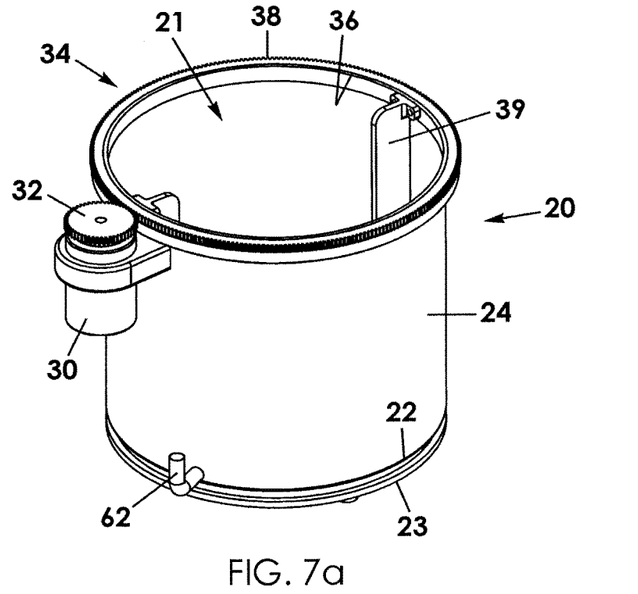
FIG. 7a is a perspective view of the processing assembly removed from the remainder of the apparatus.
Figure 7B:
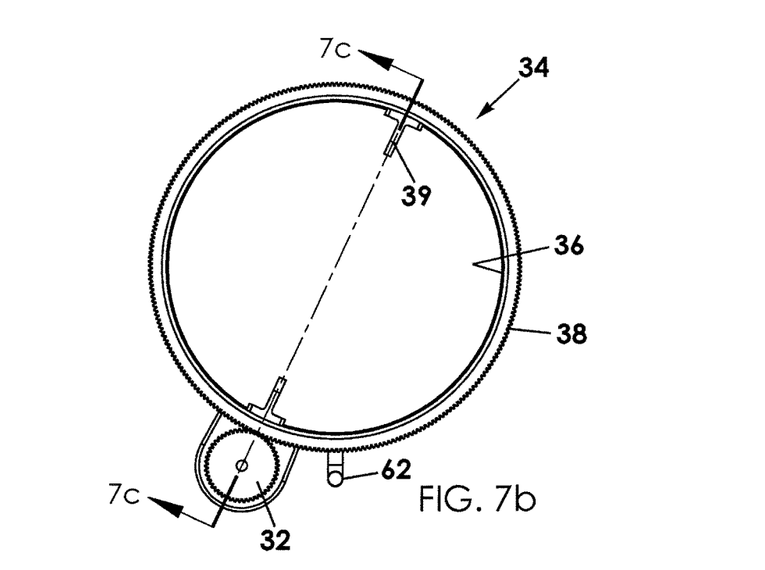
Figure 7C:
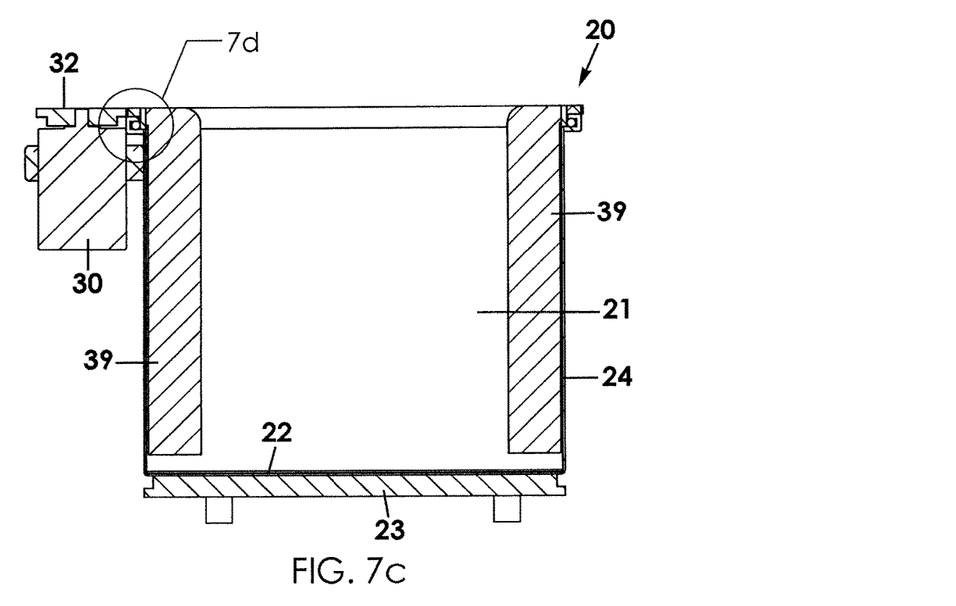
FIG. 7c is a sectional view taken along line 7c-7c of FIG. 7b.
Figure 7D:
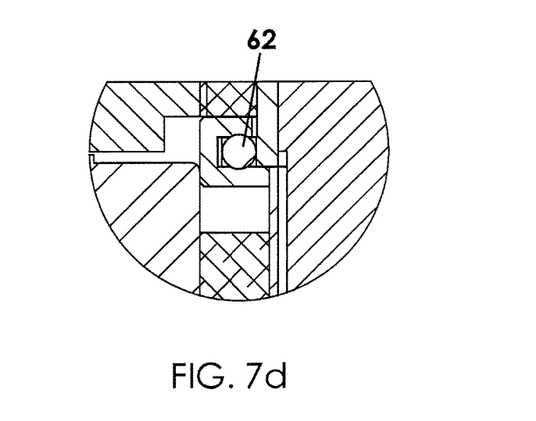
FIG. 7d is an isolated view on an enlarged scale taken from FIG. 7c.
Figure 8A:
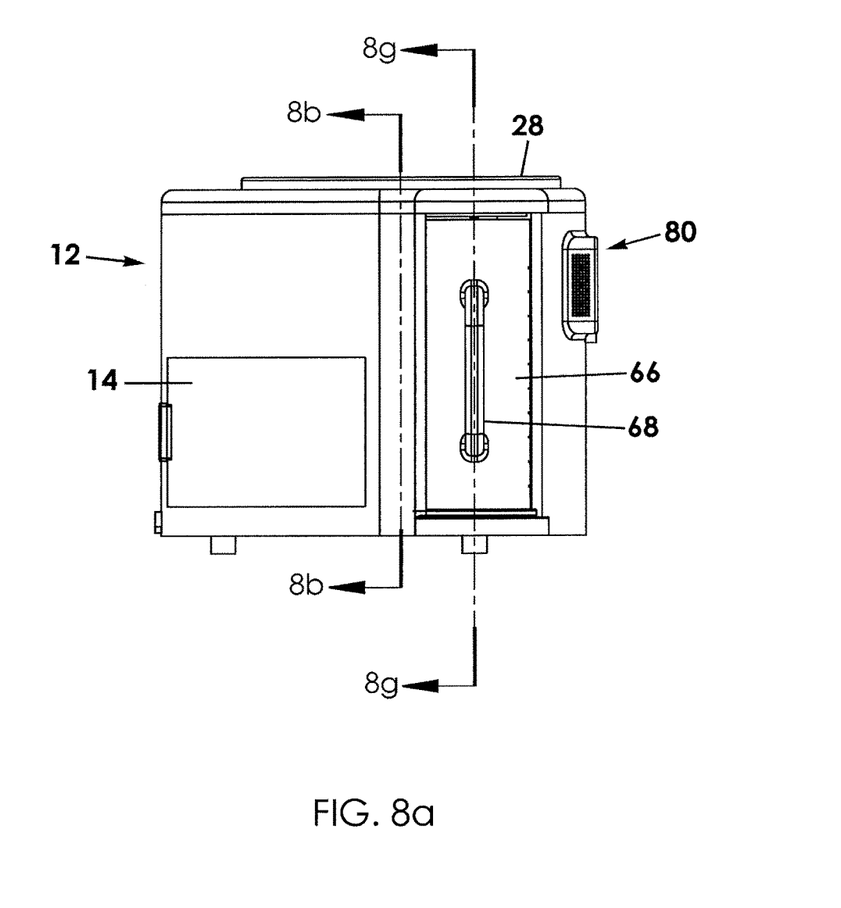
Figure 8B:
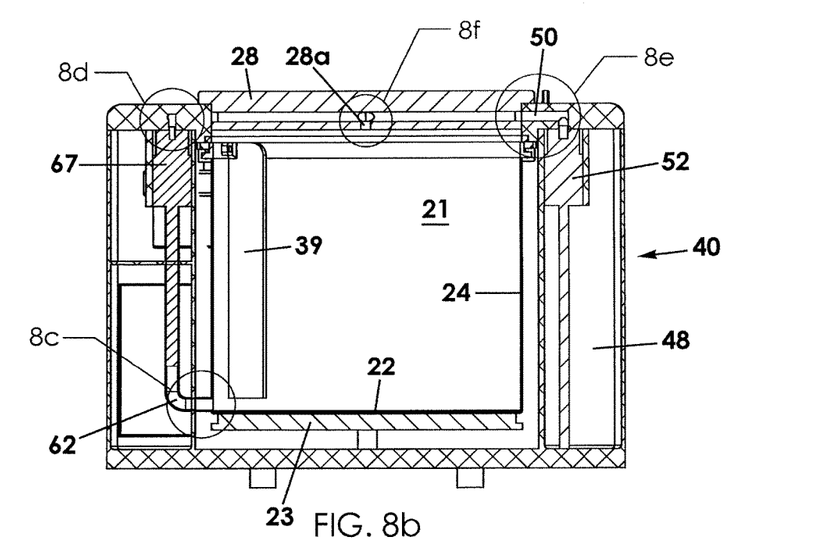
Figure 8C:
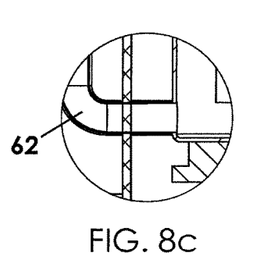
FIG. 8c is an isolated view on an enlarged scale taken from FIG. 8b.
Figure 8D:
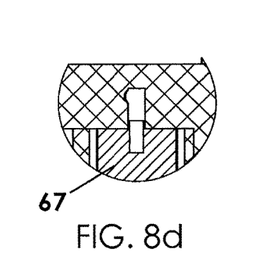
FIG. 8d is an isolated view on an enlarged scale taken from FIG. 8b.
Figure 8E:
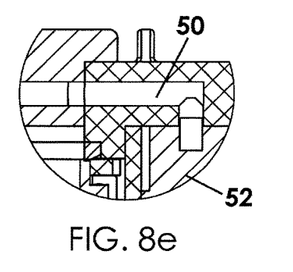
FIG. 8e is an isolated view on an enlarged scale taken from FIG. 8b.
Figure 8F:
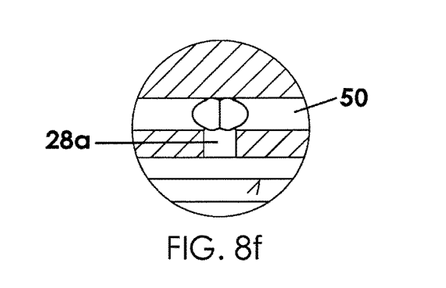
FIG. 8f is an isolated view on an enlarged scale taken from FIG. 8b.
Figure 8G:
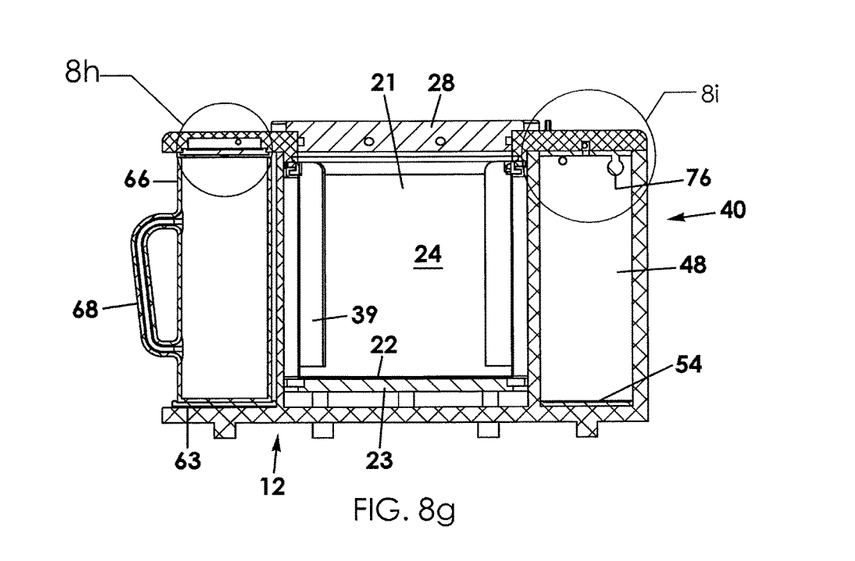
Figure 8H:
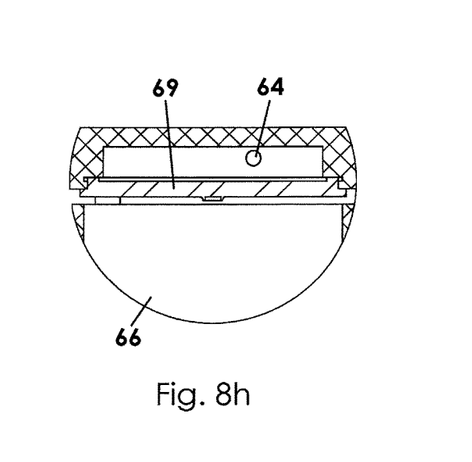
FIG. 8h is an isolated view on an enlarged scale taken from FIG. 8g.
Figure 8I:
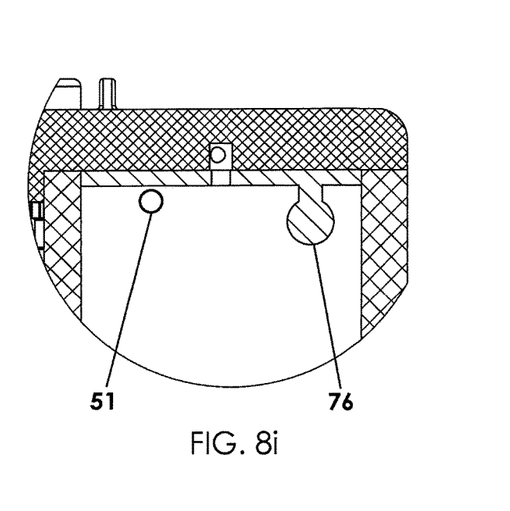
FIG. 8i is an isolated view on an enlarged scale taken from FIG. 8g.

A juice extracting apparatus according to a preferred embodiment of the present invention will now be discussed in detail with reference to FIGS. 1a to 8i of the accompanying drawings. The juice extracting apparatus 10 includes a processing assembly 20, a steam assembly 40, an extraction member 70, and a collection assembly 60.

The juice extracting apparatus 10 includes a housing 12 to which the processing assembly 20, steam assembly 40, and collection assembly 60 may be operatively coupled. In an embodiment, the housing 12 and respective assemblies may all be coupled together and may have an integrated and singular construction. Further, the housing 12 may define an internal storage compartment and a door 14 pivotally coupled to an outer surface of the housing 12. The door 14 is selectively movable between a closed configuration blocking access to the storage compartment and an open configuration allowing access to the storage compartment. The housing 10 may include an internal cold water tank 15 for storing water that will later be transferred to the steam chamber 48 or processing chamber 21.

The processing assembly 20 is the primary component positioned in the housing 12. Specifically, the processing assembly 20 includes a bottom wall 22 and one or more upstanding side walls extending upwardly from the bottom wall 22. As shown in the drawings, a continuous side wall 24 having a generally cylindrical configuration extends upwardly from peripheral edges of the bottom wall 22, the bottom wall 22 and side wall 24 defining an processing chamber 21 capable of receiving a quantity of water and a plurality of leaves from which juice is to be extracted as will be described later. The housing 12 has larger dimensions than dimensions of the processing assembly 20 and may include additional components situated beneath the bottom wall 22 of the processing assembly 20, as will be described later.

The upstanding side wall 24 includes an upper rim 26 (i.e. upper edge) that defines an open top 29 that is configured to allow access into the processing chamber 21. Further, the processing chamber 21 includes a lid 28 that is configured to selectively cover the open top 29 so as to regulate access to the processing chamber 21. Specifically, the lid 28 is configured to block access when positioned atop the upper rim 26 and to allow access when removed therefrom. The processing chamber 21 is configured to receive a quantity of water and leaves, such as bitter leaves, to be processed, e.g. to have juice extracted therefrom. An internal water fill plug 19 regulates a water fill opening 19a for filling the cold water tank 15. The upstanding side wall 24 may define a vertical window 25 through which a user may determine visually how much water is in the processing chamber 21, the window 25 being including glass or transparent plastic and may include scale indicia.

The steam assembly 40 is also coupled to the housing 12 and includes walls defining a steam chamber 48 in fluid communication with the processing chamber 21 of the processing assembly 20. A steam inlet channel 51 having a tubular configuration connects the processing chamber 21 to the steam chamber 48 such that water may be communicated therebetween via the steam inlet channel 51. The steam assembly 40 also includes a steam pump 52 operatively connected to the processing assembly 20 and steam delivery channel 51 for pumping a portion of the water from the processing chamber 21 into the steam chamber 48 when energized. The steam pump 52 may be in electrical communication with a power source and is energized by actions of a user, as will be described later.

The steam assembly 40 may include a steam heating element 54 positioned configured to impart heat to the steam chamber 48 when energized so as to change the state of the water therein from liquid to gas—in other words, into steam. The steam heating element 54 may be positioned just beneath a lower wall of the steam chamber 48 and electrically connected to a power source, the steam heating element being energized by action of a user, as will be described later. A steam transfer channel 50 connects the steam chamber 48 to the processing chamber 21 and is configured to allow generated steam to pass into the processing chamber 21 to aid in the juice extraction process. In an embodiment, the steam delivery channel 51 is utilized to direct steam to the processing chamber 21.

In an embodiment, the steam transfer channel 50 may be in communication with complementary channels 28a defined in the lid 28 for directing steam downwardly into the processing chamber 21.

An ultraviolet light ("UV") ozone generator 76 may be mounted inside the steam chamber 48. This component directs ambient air past an ultraviolet light which changes the oxygen ($O_2$) into ozone ($O_3$). Ozone is a powerful oxidizer which neutralizes odor at the molecular level. The ozone (or ozone/oxygen mixture) may be converted to steam as described above and then transferred into the processing chamber where it neutralizes odor of the extracted bitter leaf juice.

The collection assembly 60 is also coupled to the housing 12 and includes a tubular collection channel 62 in fluid communication with the processing chamber 21 of the processing assembly 20. The collection channel 62 includes an outlet port 64 adjacent a collection reservoir 66 and positioned to deposit fluid received from the processing chamber 21 into the collection reservoir 66 via an open upper end (or an opening through the top) defined thereby. The collection reservoir 66 includes a closed bottom and continuous upstanding side wall defining the open upper end. The collection assembly 60 includes a collection pump 67 electrically connected to a power source and configured to pump juice extracted from leaves in the processing chamber 21 to the outlet port 64 via the collection channel 62 when energized. In addition, the collection assembly 60 may also include a heating element 63 situated on a base that selectively supports the collection reservoir 66 so as to selectively impart heat to the collection reservoir 66.

It will be understood that the collection reservoir 66 is removably coupled to the collection assembly 60 so that collected juice extracted from leaves in the processing chamber 21 may be stored, taken for processing, or consumed by a user. The collection reservoir 66 may include a handle 68 coupled to an outer wall to enhance a user's ability to manually remove or replace the collection reservoir. Further, the collection reservoir 66 may be constructed of a transparent material and may include scale indicia 65 imprinted thereon so as to indicate a volume of liquid therein. In addition, the collection assembly 60 may include a filter cartridge 69 or other filter media adjacent to or integrated with the outlet port 64 that is configured to filter impurities from the extracted juice as it is communicated to the collection reservoir 66.

The leaf juice extracting apparatus 10 includes a power source or a means of being electrically connected to a power source. More particularly, the housing 12 may include an electrical cord or plug 16 configured for connection to an AC electrical receptacle. Alternatively, a battery 18 may be positioned on or in the housing 12. In either case, the power source is electrically connected to the steam pump 52, collection pump 67, steam heating element 54, and additional pumps, heating elements, and controls yet to be described below. It is also contemplated that the power source may be solar power. The system may include an international voltage converter as well. The apparatus 10 may also include a USB port in communication with the electronics module 80 (described below) so that ring tones may be downloaded and used during operation of the apparatus 10, to play music, and the like.

The processing assembly 20 is where juice is extracted from a quantity of leaves placed in the processing chamber 21. The processing assembly 20 includes a processing chamber drive motor 30 in electrical communication with the battery 18 or other power source and is actuated when energized thereby. Further, the processing assembly 20 includes a drive assembly 34 mounted along the upper rim 26 of the side wall of the processing assembly 20, the drive assembly being positioned adjacent the open top 29. The drive assembly 34 is configured to move around the open top 29 when actuated, i.e. when energized by the battery 18.

Further, the processing assembly 20 includes at least one agitator blade 39 in electrical communication with the battery 18 or other power source and with the processing chamber drive motor 30. The agitator blade 39 includes a first end operatively coupled to the drive assembly 34 and an opposed second end extending downwardly into the processing chamber 21. The agitator blade 39 is configured to move along the drive assembly and, consequently, to move around inside the processing chamber 21, when the agitator blade 39 is actuated by operation of the drive motor 30. The role of the agitator blade 39 is to stir the mixture within the processing chamber 21 and not to damage or destroy the leaves therein.

The processing chamber drive motor 30 includes a drive gear 32 that is rotated when the drive motor 30 is energized. Further, the drive assembly 34 includes a track assembly having a plurality of gear teeth 38 that are operatively coupled to the drive gear 32. As a result, the drive assembly 34 is moved along adjacent the open top of the processing assembly 20 when the drive motor 30 is energized.

In addition, a processing chamber heating element 23 may be situated in the interior of the housing 12 and positioned beneath the bottom wall 22 of the processing chamber 21. Specifically, the processing chamber heating element 23 may be mounted to a lower surface of the bottom wall 22. The processing chamber heating element 23 is configured to generate heat when energized—and thereby to heat the bottom wall 22 of the processing chamber 21. It is understood that applying heat while processing and extracting juice from the leaves within the processing chamber 21 may be beneficial. The processing chamber heating element 23 may be electrically connected to the battery 18 and electronics module 80 (described below) and actuated thereby.

The leaf juice extracting apparatus includes an extraction member 70 configured to be selectively inserted into the processing chamber 21 and manipulated by a user to apply compressive and agitation forces to the leaves that have previously been placed therein. As a result, juice is removed from the leaves and subsequently transferred to the collection assembly 60 as described above. The extraction member 70 may include a compression plate 71 having a generally planar configuration and circular profile. In other words, the compression plate 71 may have a disc shape, particularly if the shape of the processing chamber 21 is cylindrical. The extraction member 70 may also include an elongate handle 72 extending upwardly from an upper surface of the compression plate 71. A free end 74 of the elongate handle 72 may have an ergonomic configuration that enhances the grip of a user. A user is able to control the amount of pressure, kneading, and churning of contact with the leaves so that the leaves are not unduly or unintentionally torn or damaged.

It is contemplated in more advanced embodiments (such as commercial versions) that the extraction member 70 may be integrated into the processing chamber 21 and operated under electronic control.

Actuation of the operative components of the present invention is accomplished via an electronics module 80. More particularly, an electronics module 80 is mounted to an exterior surface of the housing 12 proximate the processing assembly 20 and is electrically connected to the processing chamber drive motor 30, the steam chamber pump 52, and the collection pump 67. In an embodiment, the electronics module 80 may include a processor configured to execute programming instructions stored in a non-volatile memory or, alternatively, include equivalent electronic connections or circuitry.

The electronics module 80 may include a display device 82 and an input member 84 for communicating visually with a user and receiving communications from a user, respectively. It is understood that the display device 82 may be a digital display having touch screen capabilities; in other words, the display device 82 and input member 84 may be of singular construction. The input member 84 may also include selection buttons in data communication with the processor, memory, and circuitry. In some embodiments, the electronics module 80 may include a speaker 86. The user may select a mode of operation, an amount of time of processing, and other selections.

The electronics module 80 may be programmed such that different operative steps or modes of operation are possible. In use, operation of the juice extraction apparatus 10 is controlled by the electronics module 10 per selections made by a user via the input member 84. After water and bitter leaves are inserted into the processing chamber 21, a user may select operations via the input member 84. For instance, selection of the default or basic mode of operation may result in the processing chamber drive motor 30 being energized, movement of the agitation blade(s) 39, energizing the processing chamber heating element, and the like. The steam chamber pump 52 may be energized to first pump a predetermined amount of water into the steam chamber 48 where the ozone generator 76 is actuated, steam is generated, and the steam is transmitted back into the processing chamber 21 as described above. At this point, a user may position the extraction member 70 in the processing chamber 21 and apply a selected amount of pressure against the leaves. As a result, juice is squeezed from the leaves and becomes mixed in the water. Then, the electronics module 80 causes the collection pump 67 to urge the extracted juice to the outlet port 64 and into the collection reservoir 66 as described above.

Other features and embodiments are also contemplated. More particularly, the processing assembly 20 may include a steam and boil feature. It is understood that this is possible via programming of the electronics module 80 in cooperation with the steam assembly 40 and respective heating elements described above.

It is understood that the order of steps of operation described above may occur in a different order per instructions received from a user via the input member 84 or as may be programmed. Further, while certain forms of this invention have been illustrated and described, it is not limited thereto except insofar as such limitations are included in the following claims and allowable functional equivalents thereof.

The invention claimed is:

1. A leaf juice extracting apparatus for extracting juice from a plurality of leaves, comprising:
   a processing assembly having a bottom wall having a planar configuration and an upstanding side wall that, together, define an processing chamber for receiving the plurality of leaves and water, said side wall having an upper rim that defines an open top configured to allow access into said processing chamber;
   wherein said processing assembly includes a heating element positioned adjacent a lower surface of said bottom wall and configured to impart heat to said bottom wall when energized;
   a lid removably coupled to said upper rim and configured to cover said open top;
   a steam assembly in fluid communication with said processing chamber for selectively receiving an incoming water portion from said processing chamber into a steam chamber, said steam chamber including a steam heating element configured to change the incoming water portion into steam;
   an extraction member selectively situated in said processing chamber of said processing assembly and configured to selectively apply pressure upon the plurality of leaves therein so as to cause juice to be extracted from the plurality of leaves;
   wherein said extraction member includes:
      a compression plate having a generally planar configuration that is parallel to said bottom wall of said processing assembly when situated in said processing chamber;
      an elongate handle extending upwardly from an upper surface of said compression plate;
      said compression plate is configured to sandwich the plurality of leaves between said compression plate and said bottom wall of said processing assembly such that the plurality of leaves are not grated, shredded, or destroyed; and
   a collection assembly in fluid communication with said processing chamber that is configured to selectively communicate said extracted juice from said processing chamber into a collection reservoir;
   wherein said collection assembly includes a base positioned to support said collection reservoir and a collection heating element situated on said base for imparting heat thereto when energized so as to process said extracted juice.

2. The leaf juice extracting apparatus as in claim 1, wherein said steam assembly includes:
   a steam channel having a tubular configuration interconnecting said steam chamber with said processing chamber of said processing assembly; and
   a steam chamber pump configured to pump water from said processing chamber of said processing assembly to said steam chamber via said steam channel when energized.

3. The leaf juice extracting apparatus as in claim 2, wherein said collection assembly includes:
   a collection channel having a tubular configuration interconnecting said processing chamber of said processing assembly to an outlet port in communication with said collection reservoir; and
   a collection chamber pump configured to pump said extracted juice from said processing chamber of said processing assembly to said outlet port via said collection channel when energized.

4. The leaf juice extracting apparatus as in claim 3, wherein said collection reservoir is removably coupled to said processing chamber, said collection reservoir including a closed lower end and an upstanding side wall having an upper edge defining an open upper end such that said extracted juice, once pumped into said collection reservoir, is selectively removed via said open upper end.

5. The leaf juice extracting apparatus as in claim 4, wherein said collection assembly includes a removable and replaceable filter cartridge adjacent said outlet port such that said extracted juice is filtered as it is communicated into said collection reservoir.

6. The leaf juice extracting apparatus as in claim 4, further comprising a power source in electrical communication with said steam chamber pump and said collection chamber pump for energizing said steam chamber pump and said collection chamber pump when actuated.

7. The leaf juice extracting apparatus as in claim 4, wherein said side wall of said collection reservoir includes:
   an outer surface having a plurality of scale indicia;
   a handle coupled to said outer surface that is configured to enable a user to remove said collection reservoir from said processing assembly.

8. The leaf juice extracting apparatus as in claim 6, wherein said power source is a battery.

9. The leaf juice extracting apparatus as in claim 6, wherein said processing assembly includes:
   a processing chamber drive motor in electrical communication with said battery;
   a drive assembly mounted along said upper rim of said side wall of said processing assembly and configured to move around said open top thereof when actuated;
   an agitator blade in electrical communication with said processing chamber drive motor, said agitator blade having a first end operatively coupled to said drive assembly and an opposed second end extending downwardly into said processing chamber;
   wherein said agitator blade is configured to move along said drive assembly and inside said processor chamber when actuated by said processing chamber drive motor.

10. The leaf juice extracting apparatus as in claim 9, wherein:
   said processing chamber drive motor includes a drive gear that is rotated when said processing chamber drive motor is energized;
   said drive assembly includes a track assembly having a plurality of gear teeth operatively coupled to said drive gear such that said drive assembly is moved about said open top of said processing assembly when said processing chamber drive motor is energized.

11. The leaf juice extracting apparatus as in claim 9, further comprising:

an electronics module coupled to said processing assembly and electrically connected to said processing chamber drive motor, said steam chamber pump, and said collection chamber pump; and a display device having an input member in electrical communication with said electronics module, said electronics module being programmed and configured to selectively energize said processing chamber drive motor, said steam chamber pump, and said collection chamber pump, respectively, based on data received by said input member.

12. The leaf juice extracting apparatus as in claim 11, wherein said input member is a touch screen input device.

13. The leaf juice extracting apparatus as in claim 11, wherein said steam heating element is electrically connected to a battery and said electronics module, said electronics module being programmed to selectively energize said steam heating element in association with input data received via said input member.

14. The leaf juice extracting apparatus as in claim 1, further comprising an ultraviolet light ozone generator positioned in said steam chamber that is configured to convert oxygen in ambient air into ozone for neutralizing odor.

15. The leaf juice extracting apparatus as in claim 1, further comprising a housing, wherein said processing assembly, said steam assembly, and said collection assembly are coupled to said housing in an integrated and singular construction.

16. The leaf juice extracting apparatus as in claim 15, wherein said housing includes a storage compartment and a door pivotally coupled to an outside surface that is movable between a closed configuration blocking access to said storage compartment and an open configuration allowing access to said storage compartment.

* * * * *